(12) United States Patent
Vertanen et al.

(10) Patent No.: US 6,189,435 B1
(45) Date of Patent: Feb. 20, 2001

(54) DIAPHRAGM

(75) Inventors: Mark W. Vertanen; Shawn H. Lange, both of Creston, IA (US)

(73) Assignee: Gits Manufacturing Company, Creston, IA (US)

( * ) Notice: Under 35 U.S.C. 154(b), the term of this patent shall be extended for 0 days.

(21) Appl. No.: 09/201,025

(22) Filed: Nov. 30, 1998

(51) Int. Cl.⁷ .................................................... F01B 19/00
(52) U.S. Cl. .................. 92/103 R; 92/103 F; 92/103 SD
(58) Field of Search .............................. 92/103 R, 103 F, 92/103 SD

(56) References Cited

U.S. PATENT DOCUMENTS

| 2,940,722 | * | 6/1960 | Vargo | 92/103 F |
| 2,976,726 | * | 3/1961 | Clair et al. | 92/103 F |
| 3,424,063 | * | 1/1969 | Norwood | 92/103 F |
| 4,745,753 | | 5/1988 | Tadokoro et al. . | |
| 4,864,918 | * | 9/1989 | Martin | 92/103 F |
| 5,148,678 | | 9/1992 | Ueda et al. . | |
| 5,172,552 | | 12/1992 | Elpern et al. . | |
| 5,217,797 | * | 6/1993 | Knox et al. | 92/103 F |
| 5,291,822 | * | 3/1994 | Alsobrooks et al. | 92/103 F |

FOREIGN PATENT DOCUMENTS

| 646910 | * | 10/1962 | (IT) | 92/103 F |
| 58-110821 | | 1/1983 | (JP) . | |
| 59-153920 | | 1/1984 | (JP) . | |

* cited by examiner

*Primary Examiner*—Hoang Nguyen
(74) *Attorney, Agent, or Firm*—Zarley, McKee, Thomte, Voorhees & Sease

(57) ABSTRACT

A diaphragm for a turbo charger actuator includes a layer of fabric having upper and lower surfaces. A first layer of elastomeric material coats at least a portion of the upper surface of the fabric to prevent pressurized air from passing through. A second layer of elastomeric material coats at least a portion of the lower surface of the fabric to form a plurality of ribs thereon. The ribs reinforce the fabric and prevent dirt or other abrasive particles from wearing holes in the elastomeric material and the fabric. When the fabric has woven strands, the ribs protect some of the points where the strands intersect in key areas on the diaphragm.

15 Claims, 4 Drawing Sheets

DIAPHRAGM

BACKGROUND OF THE INVENTION

Field of the Invention

This invention relates to diaphragms. In particular, this invention relates to a diaphragm for an actuator connected to an engine turbo charger. The invention may also be applicable to other diaphragm applications.

Diaphragms made of fabric coated with elastomeric material are known. In automotive use, such diaphragms are exposed to a high number of pressure cycles and a significant amount of dirt from the surrounding environment. Dirt often collects on the underside of the diaphragm. Abrasive particles in the dirt tend to cut or abrade the crossing fibers or strands of the fabric, which allows the air pressure from the pressure side of the actuator to cause a hole to form through the diaphragm. The fabric surrounding the hole is then required to hold the air pressure. This tends to weaken the fabric and lead to its premature failure, making the actuator ineffective. Therefore, there is a need for a more dirt-resistant diaphragm for such actuators.

A primary objective of the present invention is the provision of a dirt-resistant diaphragm for an actuator.

Another objective of this invention is the provision of an actuator diaphragm having ribs formed thereon for additional strength and resistance to leaks.

Another objective of this invention is the provision of an actuator diaphragm having ribs formed on its low pressure or fabric side.

Another objective of this invention is the provision of an elastomer-coated, fabric-based diaphragm having ribs thereon which improve the penetration and adherence of elastomer and the life of the diaphragm.

Another objective of this invention is the provision of a diaphragm with ribs thereon which tend to channel contaminants away from the zone or zones of the diaphragm where failures can sometimes occur.

Another objective of this invention is the provision of an actuator having ribs which extend beyond the piston contact area.

Another objective of this invention is the provision of an actuator diaphragm having a greater life, in terms of pressure cycles, than existing actuator diaphragms.

Another objective of this invention is the provision of an actuator diaphragm that is economical to produce, durable, and reliable in use.

These and other objectives will be apparent from the drawings, as well as from the description and the claims which follow.

SUMMARY OF THE INVENTION

The present invention relates to a diaphragm. In particular, this invention relates to a diaphragm for a turbo charger actuator. The diaphragm includes a layer of fabric having upper and lower surfaces. A first layer of elastomeric material coats at least a portion of the upper surface of the fabric to prevent pressurized air from passing through. A second layer of elastomeric material coats at least a portion of the lower surface of the fabric to form a plurality of ribs thereon.

The ribs reinforce the fabric and prevent dirt or other abrasive particles from wearing holes in the elastomeric material and the fabric. When the fabric has woven strands, the ribs protect some of the points where the strands intersect in key areas on the diaphragm. The ribs also channel contaminants away from the zone(s) of the diaphragm where failures can sometimes occur.

DESCRIPTION OF THE PREFERRED EMBODIMENTS

Figure 1:
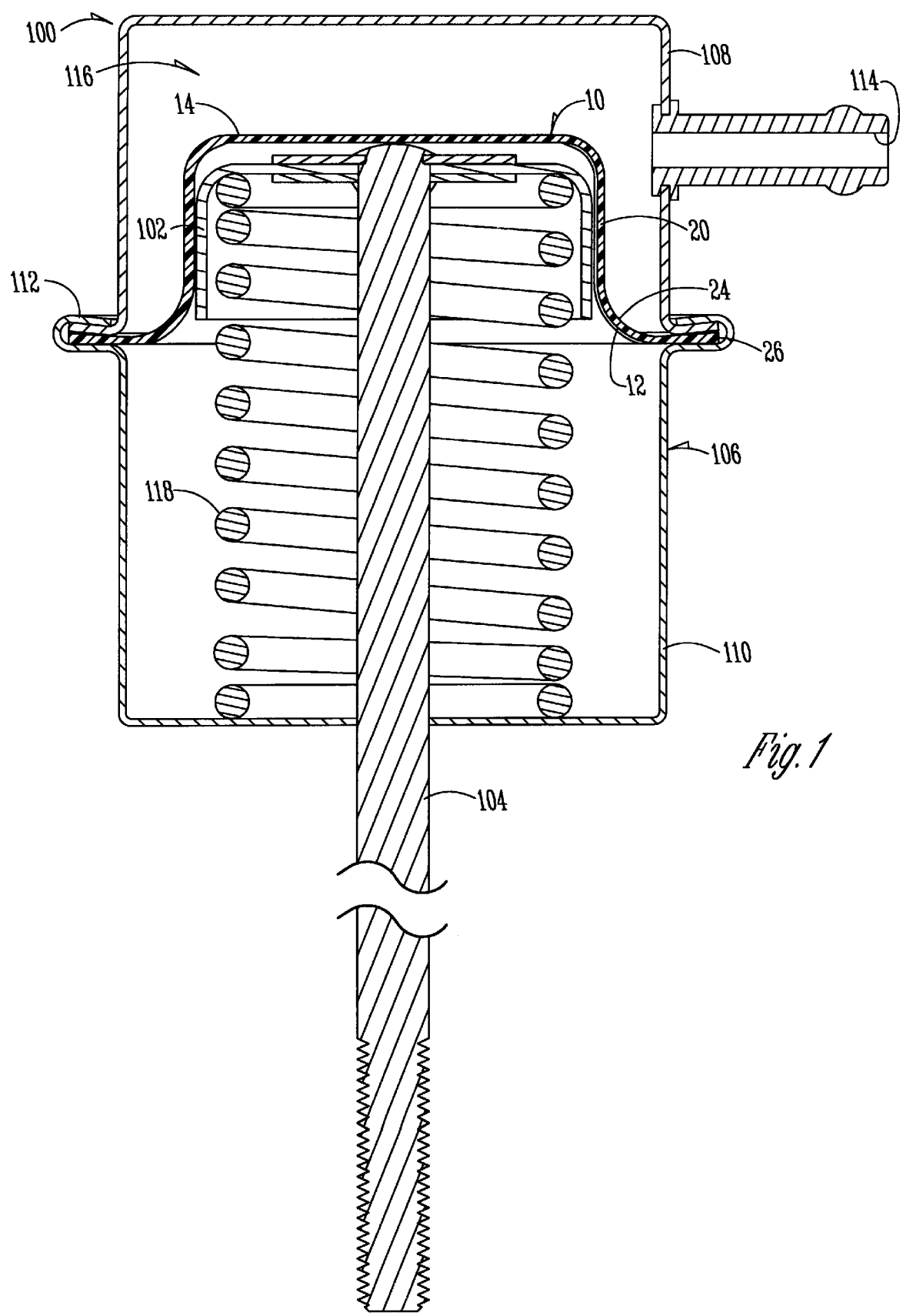
FIG. 1 is a longitudinal cross-sectional view of a turbo charger waste gate valve actuator equipped with the diaphragm of this invention.

The diaphragm of this invention is generally designated by the reference numeral 10 in the drawings and the description below. In FIG. 1, the diaphragm 10 is shown installed on an actuator 100 having a piston 102 connected to a turbo charger waste gate (not shown) by an actuator rod 104. A housing 106 encloses the piston 102, and has housing portions 108, 110 that are joined along a continuous seam 112. The diaphragm 10 is searingly interposed between the housing portions 108, 110 along the seam 112 by crimping, clamping, or other known methods.

A pressure inlet 114 is provided through the upper housing portion 108 and puts the chamber 116 above the diaphragm 10 in fluid communication with the turbo charger outlet (not shown). The diaphragm 10 has a downwardly directed or interior surface 12. The piston 102, urged by a spring 118, engages the interior surface 12 to define a piston contact area thereon. The diaphragm 10 also includes an upwardly directed or exterior surface 14 on which the pressure in a chamber 116 acts.

Thus, during the operation of the turbo charger and the associated actuator 100, the diaphragm 10 reacts to the pressure in the chamber 116 and moves the piston 102 and the attached actuator rod 104 accordingly against the spring 118. When the force of the spring 118 is overcome, the actuator rod moves vertically and thereby opens the waste gate valve to modulate the turbo charger pressure.

Figure 2:
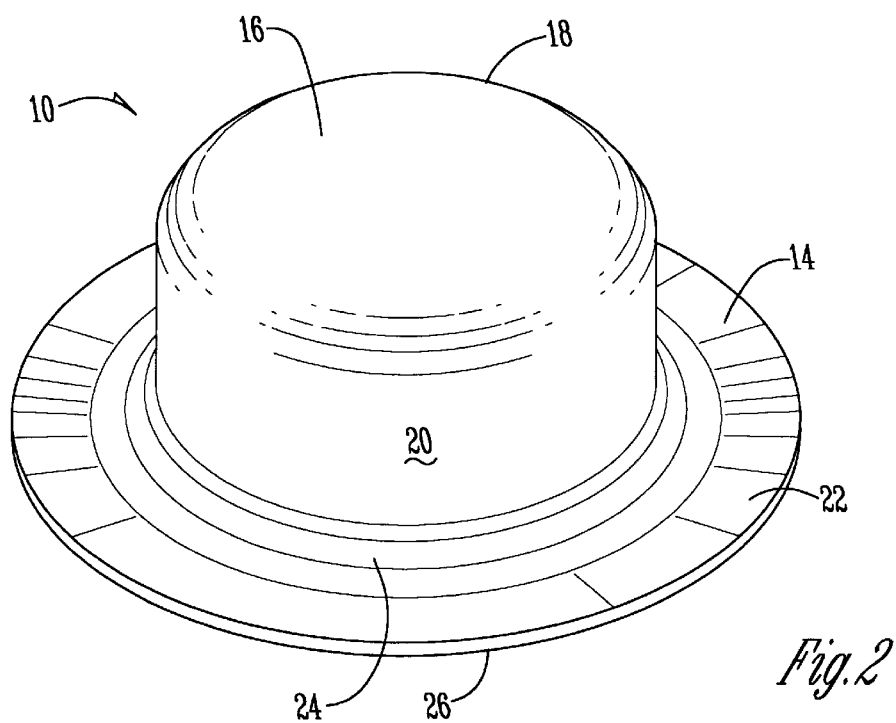
FIG. 2 is a perspective view of one embodiment of the diaphragm of this invention.

Having briefly described the environment in which the diaphragm is used, greater detail regarding the diaphragm itself will now be provided by reference to FIGS. 2–5. FIG. 2 shows that the diaphragm 10 is shaped like a cup or a top hat, with interior (lower) and exterior (upper) surfaces 12, 14. The diaphragm 10 has a substantially flat crown or top 16 with a generally circular periphery 18 supported by continuous side wall 20. The side wall 20 connects or joins the periphery 18 of the top 16 with a generally circular outwardly projecting brim 22 which terminates at an outer periphery 26. The brim 22 and the side wall 20 are joined along a continuous inside fillet or radius 24 when viewing the exterior surface 14. The diaphragm 10 is substantially symmetrical about a central axis 28. Shapes other than that just described will not detract from the invention, provided that the shape is selected to generally match the shape of the piston 102.

Figure 3:
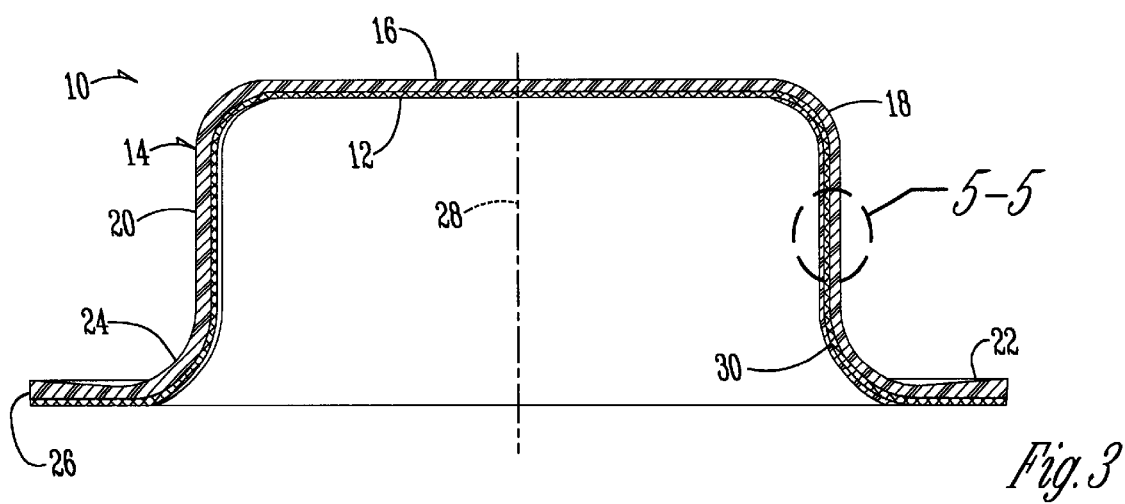
FIG. 3 is a central vertical sectional view of the diaphragm of FIG. 2.
Figure 4:
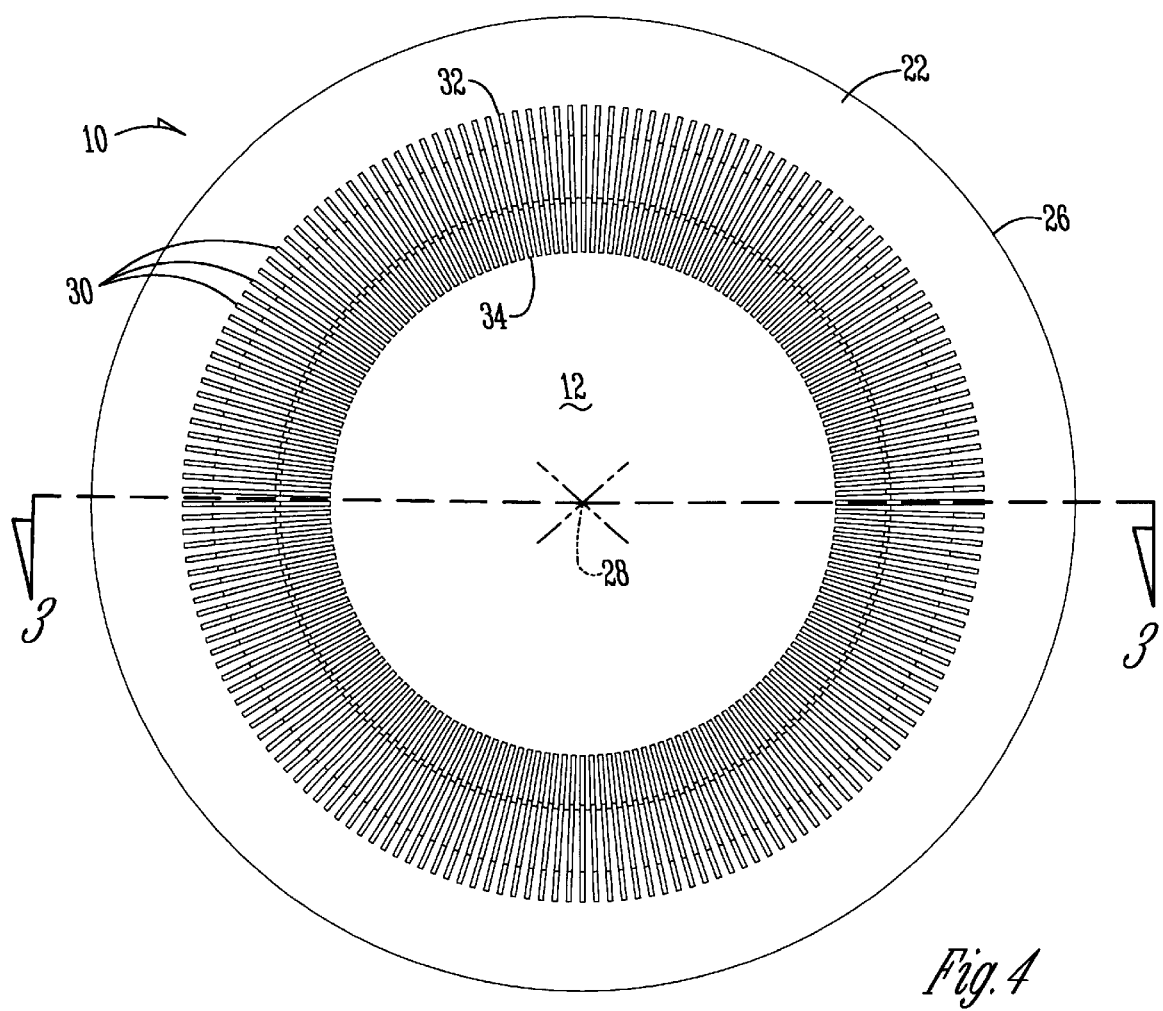
FIG. 4 is a plan view of the interior surface of the diaphragm of this invention shown in FIG. 2.

Referring to FIG. 4, the diaphragm 10 has a plurality of angularly spaced ribs 30 on the interior surface 12. The ribs 30 extend vertically along the side wall 20, protruding therefrom. The ribs 30 have an outer end 32 and a lower end 34. Preferably, the outer ends 32 of the ribs 30 extend radially outward along the inside radius 24 and onto the brim 22, as shown. Thus, at least some of the ribs 30 extend through the inside radius 24. Preferably, the ribs 30 extend 360 degrees around the central axis 28. The ribs 30 are also equally spaced along the inner circumference of the side wall 20, a full 360 degrees around the central axis 28. For example, 180 ribs are angularly spaced at intervals of two degrees between centers in FIGS. 2–5.

Figure 5:
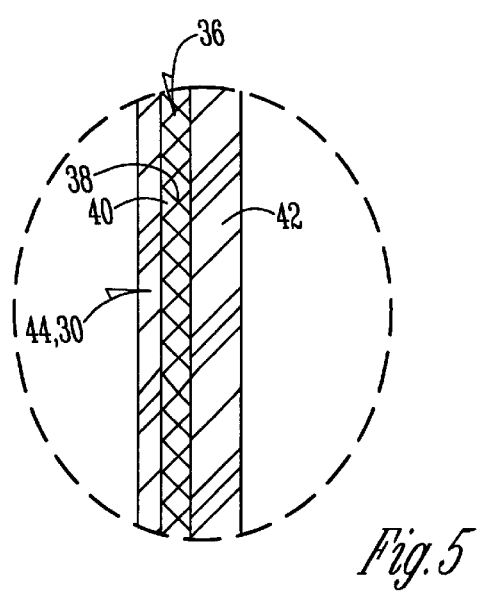
FIG. 5 is an enlarged view of the area designated 5—5 in FIG. 3.

Referring to FIGS. 3 and 5, the diaphragm 10 includes a flexible fabric layer 36. The fabric layer 36 is formed by a plurality of crossing, preferably woven, strands 37. The strands 37 extend across each other at intersections 38, leaving interstices or voids 40 between the intersecting strands 37. Nylon or Nomex™ (3D604) is the preferred material for the fabric layer 36 of the diaphragm 10 because tightly woven fabrics such as these tend to be able to hold low to moderate air pressure and can easily be molded into specific shapes. The fabric layer 36 is approximately 0.005–0.015 inch thick, more preferably 0.009 inch. The diaphragm fabric is equivalent to Mohawk HT-92.

A first elastomeric layer 42 covers at least the piston contact area, and more preferably completely covers the exterior surface 14 or pressurized side of the side of the diaphragm 10. The first layer 42 is approximately 0.010 to 0.050 inch thick, more preferably 0.017–0.042 inch. A second elastomeric layer 44 at least partially covers the interior surface 12 so as to form the ribs 30. In the preferred embodiment of FIGS. 2–5, the layer 44 is approximately 0.011 inch thick so as to yield ribs 30 protruding approximately 0.011 inch from the side wall 20. The elastomer DE42460 (fluorosilicone), available from Dow Chemical Co., has been found to have good mold ability, effectively seal the voids 40 in the fabric layer 36, and provide suitable ribs 30. With the geometry shown and the thicknesses stated above, the diaphragm 10 can be molded economically in a single pour.

Figure 6:
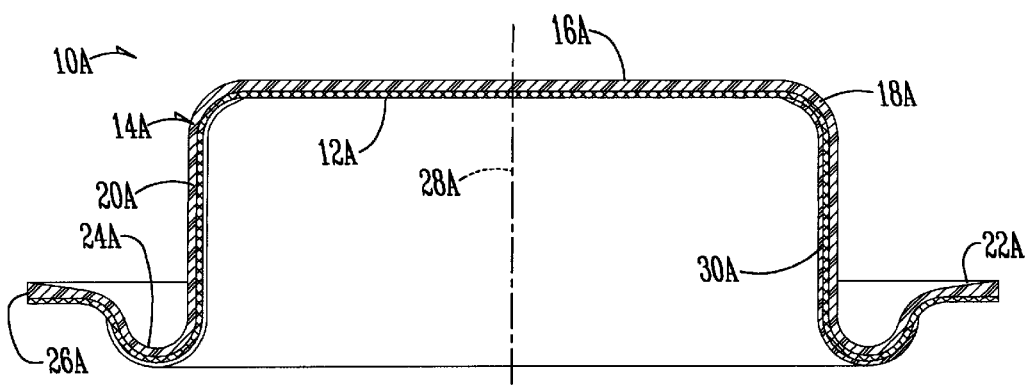
FIG. 6 is a sectional view, taken along line 6—6 in FIG. 7, of another embodiment of the present invention in which the diaphragm has an elevated or convoluted brim.
Figure 7:
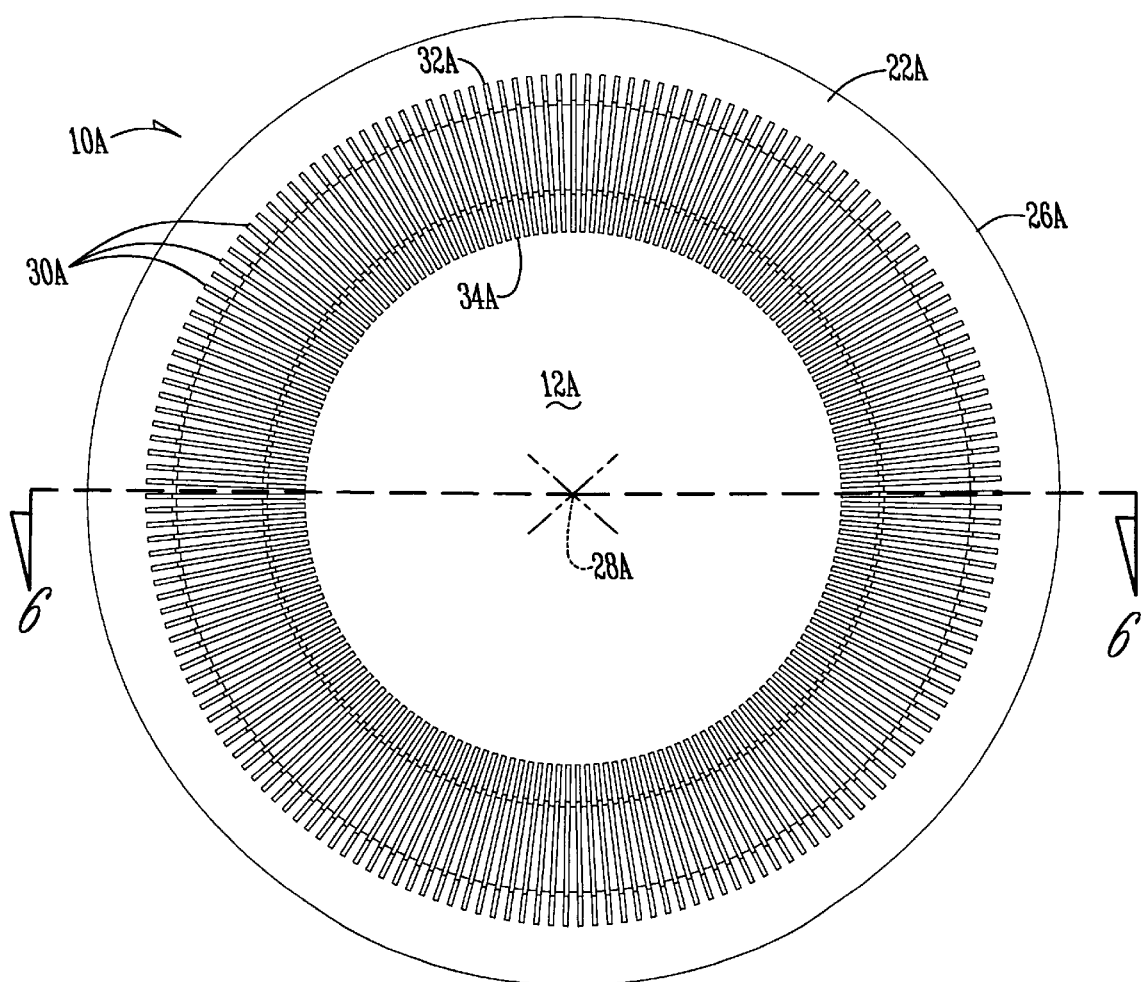
FIG. 7 is a plan view of the interior surface of the diaphragm of FIG. 6.

Another embodiment of this invention appears in FIGS. 6–7 and is similar to the embodiment of FIGS. 2–5, but is convoluted around the inside radius. The radius 24A is much smaller than the radius 24 in the embodiment of FIG. 3. Consequently, the brim 22A is elevated above the plane containing the lowermost portion of the inside radius 24A. This structure is believed to provide easier rolling and unrolling of the diaphragm 10A as the pressure forces diaphragm 10A (and the piston 102) downward. The ribs 30A are still equally spaced angularly, with approximately two degrees between centers. Other structural features are labeled similar to FIGS. 2–5, but the suffix "A" is added.

The diaphragms 10, 10A are fabricated according to the following process. A sheet of fabric is placed in a performing mold. Depending on the relative size of the diaphragm to the sheet of fabric and the mold dimensions, several diaphragms can be molded and cut from each sheet. Next, the preformed fabric layer 36 is transferred to a compression molding machine where one or more rubber pellets are inserted. Negative impressions of the ribs 30, 30A have been formed in the rubberizing mold. When the mold and/or material is held at an elevated temperature sufficient to melt the elastomeric material, the material flows and/or is injected into all voids in the mold to form the first and second elastomeric layers, as well as the ribs on the second layer. The rubberizing mold can have multiple cavities like the performing mold. Finally, the molded diaphragms 10, 10A are transferred to a trim tool where they are cut to final size.

During molding, the diaphragms 10, 10A tend to exhibit greater elastomer penetration into the fabric. The ribs 30, 30A tend to push the fabric side or layer 36 away from the mold slightly so as to allow more elastomer to penetrate and adhere to the fabric layer 36 from both sides, even in areas where the ribs do not extend.

In use, actuator diaphragms tend to eventually fail around the crevice or zone near where the top edge of the piston 102 contacts the diaphragm 10, 10A. Applicants have discovered that abrasion from dirt or other contamination that collects in the crevice often causes such failures. The ribs 30, 30A provide natural routes or channels through which the contaminants escape from the zone around the crevice as the diaphragm flexes.

Therefore, the present invention at least achieves its stated objectives.

In the drawings and specification there has been set forth preferred embodiments of the invention, and although specific terms are employed, these are used in a generic and descriptive sense only, and not for purposes of limitation. Changes in the form and proportion of parts as well as in the substitution of equivalents are contemplated as circumstances may suggest or render expedient without departing from the spirit or scope of the invention as further defined in the following claims.

We claim:

1. A diaphragm, comprising:
   a fabric support member having opposite sides, the fabric support member being formed by a plurality of flexible strands of material extending generally transversely across each other to define a plurality of intersections and voids therebetween;
   a first elastomeric coating on one of the sides of the fabric support member; and
   a second elastomeric coating on the other side of the fabric support member, the second elastomeric coating being formed into a plurality of spaced apart ribs, at least some of the ribs covering at least some of the intersections;
   the fabric support member and the first and second elastomeric coatings being formed into a cup shape having a central axis and interior and exterior surfaces; and
   the ribs extending radially and being angularly spaced about the central axis.

2. The diaphragm of claim 1 wherein the ribs are equally spaced abut the central axis.

3. The diaphragm of claim 1 wherein the cup shape comprises a generally circular top and a continuous side wall joining the periphery of the top to a generally circular brim at an inside radius connecting the brim and the side wall.

4. The diaphragm of claim 3 wherein the inside radius extends below a horizontal plane containing the circular brim.

5. The diaphragm of claim 3 wherein the inside radius is a fillet extending between the side wall and the brim.

6. The diaphragm of claim 3 wherein the ribs comprise a plurality of ribs extending vertically from the side wall and protruding therefrom.

7. The diaphragm of claim 3 wherein the ribs protrude outwardly with respect to the side wall on the interior surface of the cup shaped diaphragm.

8. The diaphragm of claim 3 wherein at least some of the ribs extend through the inside radius.

9. The diaphragm of claim 8 wherein the ribs extend 360 degrees around the central axis.

10. The diaphragm of claim 8 wherein the ribs extend outwardly from the inside radius and onto the brim.

11. The diaphragm of claim 3 wherein the ribs comprise a series of angularly spaced ribs disposed 360 degrees around the side wall on the interior of the cup shape diaphragm.

12. The diaphragm of claim 11 wherein the angularly spaced ribs are spaced apart by approximately two degrees.

13. The diaphragm of claim 1 wherein the fabric support member is a sheet of woven nylon material.

14. In combination with a turbo charger actuator comprising a housing having upper and lower housing portions joined along a continuous seam, an inlet for air from the turbo charger, a piston secured to a rod that is axially movable within the housing in response to pressure of the air in the turbocharger;

a diaphragm positioned above the piston and searingly interposed between the upper and lower positions of the housing, the diaphragm comprising:

a layer of fabric having an upper surface and a lower surface;

a first layer of elastomeric material coating at least a portion of the upper surface of the fabric to prevent passage of pressurized air therethrough;

a second layer of elastomeric material coating at least a portion of the lower surface of the fabric to form a plurality of ribs thereon;

the diaphragm being formed into a cup shape having a side wall that extends 360 degrees around a central axis;

the ribs protruding from the lower surface at the side wall; and the ribs extending radially with respect to the central axis and being angularly about the central axis.

15. The combination of claim 14 wherein the piston yieldingly engages the lower surface of the diaphragm to define a piston contact area and the ribs extend beyond the piston contact area.

* * * * *